US009552363B2

(12) United States Patent
Novak et al.

(10) Patent No.: US 9,552,363 B2
(45) Date of Patent: Jan. 24, 2017

(54) FILE MANAGEMENT WITH PLACEHOLDERS (71) Applicant: Microsoft Corporation, Redmond, WA (US)

(72) Inventors: Michael John Novak, Redmond, WA (US); Chris Guzak, Kirkland, WA (US); Sangeeta Ranjit, Newcastle, WA (US); Scott David Hoogerwerf, Seattle, WA (US); Amnon Itamar Govrin, Issaquah, WA (US); Marc Wautier, Seattle, WA (US); Kiernon Reiniger, Snohomish, WA (US); Ramanarayanan Ramani, Seattle, WA (US); Oded Yehuda Shekel, Bellevue, WA (US); Relja Ivanovic, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 13/873,241

(22) Filed: Apr. 30, 2013

(65) Prior Publication Data
US 2014/0324776 A1 Oct. 30, 2014

(51) Int. Cl.
G06F 17/30 (2006.01)
(52) U.S. Cl.
CPC ... *G06F 17/30174* (2013.01); *G06F 17/30153* (2013.01)
(58) Field of Classification Search
None
See application file for complete search history.

(56) References Cited

U.S. PATENT DOCUMENTS 5,721,916 A 2/1998 Pardikar
6,011,537 A * 1/2000 Slotznick ................ G06F 3/14
707/E17.119
7,441,011 B2 * 10/2008 Lin et al. ................ 709/217
(Continued)

FOREIGN PATENT DOCUMENTS

WO 95/23376 A1 8/1995
WO 2008/095237 A1 8/2008
WO 2013/036920 A1 3/2013

OTHER PUBLICATIONS

"Basic Concepts", Retrieved at <<http://technet.microsoft.com/en-us/library/cc938459.aspx>>, Mar. 16, 2011, pp. 3.
(Continued)

*Primary Examiner* — Jay Morrison
(74) *Attorney, Agent, or Firm* — Bryan Webster; Dan Choi; Micky Minhas (57) ABSTRACT Aspects of the subject matter described herein relate to file system placeholders. In aspects, placeholders may be used by a client to represent remote file system objects. The placeholders may include metadata and may also include none, some, or all of the content of the represented remote file system objects. In conjunction with local file system metadata, the placeholders allow a file system namespace to be navigated and may also allow other operations to be performed on the file system objects even when the client is offline with respect to the remote file system. After connectivity is re-established with the remote file system, the placeholders may be used in synchronizing changes.

20 Claims, 5 Drawing Sheets (56) References Cited

U.S. PATENT DOCUMENTS

| | | | |
|---|---|---|---|
| 7,603,397 | B1 | 10/2009 | Hagerstrom et al. |
| 8,065,381 | B2* | 11/2011 | Srinivasan ........ G06F 17/30132 709/213 |
| 8,331,566 | B1 | 12/2012 | Foote et al. |
| 8,417,746 | B1 | 4/2013 | Gillett, Jr. et al. |
| 8,468,070 | B1 | 6/2013 | Scofield |
| 2002/0073214 | A1* | 6/2002 | Iinuma ................... G06F 21/10 709/229 |
| 2004/0019613 | A1 | 1/2004 | Jones et al. |
| 2004/0049513 | A1 | 3/2004 | Yakir et al. |
| 2004/0267812 | A1* | 12/2004 | Harris .................. G10H 1/0058 |
| 2005/0198385 | A1 | 9/2005 | Aust et al. |
| 2005/0210119 | A1 | 9/2005 | Kumar |
| 2006/0129627 | A1* | 6/2006 | Phillips ................... H04L 63/10 709/200 |
| 2006/0155943 | A1* | 7/2006 | Todd et al. ................... 711/161 |
| 2006/0200570 | A1 | 9/2006 | Stirbu et al. |
| 2006/0224993 | A1 | 10/2006 | Wong et al. |
| 2006/0253501 | A1* | 11/2006 | Langan et al. ................ 707/201 |
| 2008/0010325 | A1 | 1/2008 | Yamakawa |
| 2008/0256532 | A1* | 10/2008 | Xie ........................... G06F 8/61 717/178 |
| 2009/0030620 | A1 | 1/2009 | Novo et al. |
| 2009/0172274 | A1 | 7/2009 | Nochimowski et al. |
| 2009/0193107 | A1 | 7/2009 | Srinivasan et al. |
| 2010/0100427 | A1* | 4/2010 | McKeown .......... G06Q 10/067 705/322 |
| 2010/0325199 | A1 | 12/2010 | Park et al. |
| 2011/0099212 | A1* | 4/2011 | Hahn ................ G06F 17/30174 707/822 |
| 2012/0110015 | A1 | 5/2012 | Nath et al. |
| 2012/0158891 | A1 | 6/2012 | Dooley et al. |
| 2012/0167074 | A1 | 6/2012 | Rajpure et al. |
| 2012/0179553 | A1 | 7/2012 | Duggal |
| 2012/0215820 | A1 | 8/2012 | Ogasawara et al. |
| 2013/0007263 | A1 | 1/2013 | Soroushian et al. |
| 2013/0036135 | A1 | 2/2013 | Brockey et al. |
| 2014/0250069 | A1 | 9/2014 | Lakshminarayanan et al. |

OTHER PUBLICATIONS

"International Search Report & Written Opinion for PCT Patent Application No. PCT/US2013/061072", Mailed Date: Feb. 21, 2014, Filed Date: Sep. 21, 2013, 11 Pages.

U.S. Patent Application entitled "Hydration and Dehydration With Placeholders"; First named inventor: Michael John Novak; filed Apr. 30, 2013; U.S. Appl. No. 13/874,474.

U.S. Patent Application entitled "Searching and Placeholders"; First named inventor: Michael John Novak; filed Apr. 30, 2013; U.S. Appl. No. 13/873,264.

U.S. Patent Application entitled "Streaming Content and Placeholders"; First named inventor: Michael John Novak; filed May 1, 2013; U.S. Appl. No. 13/874,488.

"International Search Report & Written Opinion for PCT Patent Application No. PCT/US2013/061056", Mailed Date: Jan. 2, 2014, Filed Date: Sep. 20, 2013, 9 Pages.

"International Search Report & Written Opinion for PCT Patent Application No. PCT/US2013/060250", Mailed Date: Jan. 2, 2014, Filed Date: Sep. 18, 2013, 9 Pages.

"International Search Report & Written Opinion for PCT Patent Application No. PCT/US2013/061071", Mailed Date: Jan. 2, 2014, Filed Date: Sep. 21, 2013, 10 Pages.

Office Action for U.S. Appl. No. 13/873,264, mailed Apr. 9, 2015.

Notice of Allowance, U.S. Appl. No. 13/873,264, mailed Aug. 14, 2015.

Notice of Allowance, U.S. Appl. No. 13/874,474, mailed Jun. 24, 2015.

Non Final Office Action Issued in U.S. Appl. No. 13/874474, mailed Apr. 6, 2015.

Non Final Office Action Issued in U.S. Appl. No. 13/874,488, mailed Mar. 27, 2015.

Final Office Action Issued in U.S. Appl. No. 113/874,488, mailed Aug. 14, 2015.

* cited by examiner

FILE MANAGEMENT WITH PLACEHOLDERS

BACKGROUND

Today, it is not uncommon for a family or even a single person to have multiple computing devices such as a desktop computer, a laptop, a smartphone, an internet-enabled television, a set top box, a gaming device, a reading tablet, and so forth. In addition, a user may have thousands of files that include pictures, audio, documents, and the like that are stored in the cloud or elsewhere. A user may want to access the files from one or more of the computing devices available to the user.

Downloading all of the user's content to each of the user's devices may not be possible as some devices may have very limited storage. Furthermore, even when a computing device has extensive storage, downloading the content to the computing device may consume considerable bandwidth, be costly, and take a long time.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to file system placeholders. In aspects, placeholders may be used by a client to represent remote file system objects. The placeholders may include metadata and may also include none, some, or all of the content of the represented remote file system objects. In conjunction with local file system metadata, the placeholders allow a file system namespace to be navigated and may also allow other operations to be performed on the file system objects even when the client is offline with respect to the remote file system. After connectivity is re-established with the remote file system, the placeholders may be used in synchronizing changes.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
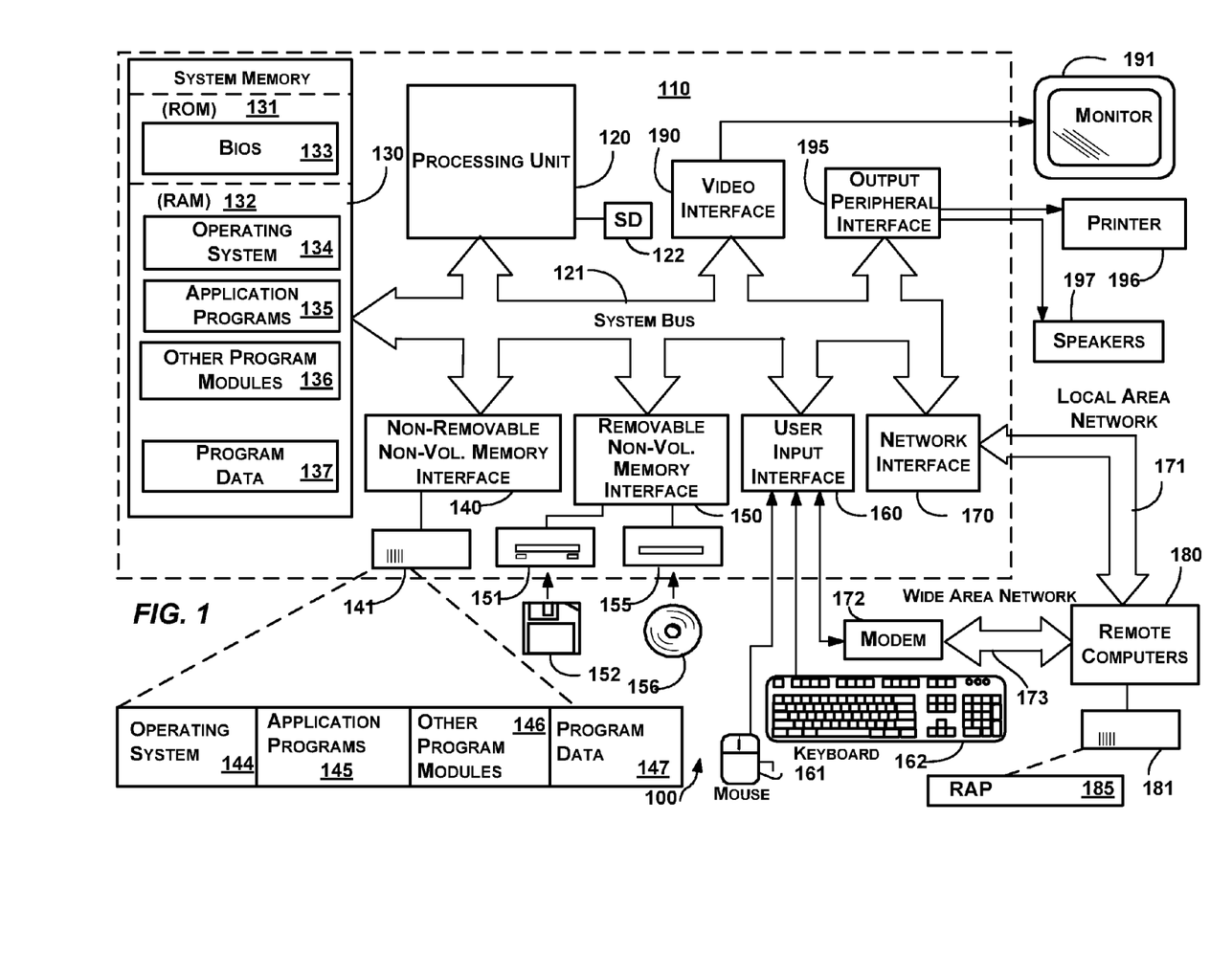
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infra-red camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Placeholders

In accordance with an aspect of the subject matter described herein, placeholders may be used. A placeholder may include a data structure that represents a file system object. A file system object may be a file or a directory. A directory may include zero or more files and may be a traditional file directory or some other collection or container of files. For simplicity, the term file is often used herein, but it is to be understood that the teachings herein may also be applied to directories without departing from the spirit or scope of aspects of the subject matter described herein.

A placeholder may be stored on a local storage device of a machine. In one implementation, a placeholder may indicate that content associated with the placeholder is available in a place other than a file system of the machine (hereinafter sometimes referred to as a local file system or a client file system). For example, a placeholder may indicate that content associated with the placeholder is stored in one of the cloud storage systems illustrated in FIG. 3.

In another implementation, a placeholder may indicate that the content is accessible through an application that resides on the machine. This application may store the content in memory, a local file system or a remote file system, may generate the content, may perform a combination of the above, or the like. Even if the file system could obtain the content directly, the file system may still rely on the application to access the content of the file.

In one implementation, for a placeholder where the associated content is relatively small (e.g., less than a predetermined, configurable, or calculated threshold), a copy of the entire content associated with the placeholder may also be stored in the placeholder. Storing data "in the placeholder" is meant to include storing the data in the data structure of the placeholder and/or storing the data in a local storage location indicated by the placeholder.

Depending on implementation, a placeholder may include various levels of details about a file. At a minimum, a placeholder includes data that identifies a file in a remote storage system. For example, a placeholder may indicate a specific cloud storage system at which the content may be found together with information (e.g., an identifier) that identifies the file to the cloud storage system.

A placeholder may include extrinsic metadata and/or intrinsic metadata of a file. Extrinsic metadata is any metadata that is stored outside of the content of the file. For example, extrinsic metadata may include name, size, date modified, date created, date last accessed, attributes of the file, version, other metadata maintained by the file system, and the like.

Intrinsic metadata is any metadata that is stored inside the content of the file. For example, for an audio file, intrinsic metadata may include artist name, album name, year, title of song, rating, tags, comments, genre, length, bit rate, and the like. For an image such as a camera picture, intrinsic metadata may include, for example, author, date taken, acquiring program name, dimensions, resolution, bit depth, compression, camera maker, camera model, f-stop, exposure time, other information, and the like.

The examples of intrinsic and extrinsic metadata described above are not intended to be all-inclusive or exhaustive of the types of intrinsic and extrinsic metadata. Indeed, based on the teachings herein, those skilled in the art will readily recognize other extrinsic and intrinsic metadata that may be used in accordance with the teachings herein without departing from the spirit or scope of aspects of the subject matter described herein.

In one implementation, a placeholder may include extrinsic metadata of a file such as name of the file, a size of the file, a date that the file was modified, and a date that the file was created. In another implementation, in addition to the above, a placeholder may also include attributes of the file.

In another implementation, a placeholder may include some or all of the intrinsic metadata of a file.

In one implementation, a placeholder may include some or all of the searchable text of a file. For example, a word processing document may have content that includes text and formatting. A placeholder may include the beginning N characters, words, paragraphs, pages, or the like of the text of the word processing document without the formatting, where N is predetermined, configurable, or determined on the fly.

In one implementation, a placeholder may include an indication of the language(s) of the searchable text. For example, a placeholder may include data that indicates that the searchable text is written in English. As another example, a placeholder may include data (e.g., a tag or other data) that indicates that a portion of the text is written in English and data (e.g., another tag or other data) that indicates that another portion of the text is written in Spanish.

As another example, a presentation program may have relatively little text compared to other data used for a presentation. In this example, a placeholder may include all the text of the presentation while omitting other data used for the presentation.

In one implementation, a placeholder may include a thumbnail of an image. The image may be included in the content of the file associated with the placeholder while the thumbnail may be generated from the image or also included in the content of the file. In one embodiment, the thumbnail included in the placeholder may be of a relatively small size that may be predefined, configurable, or determined on the fly.

In one implementation, a placeholder may include data that identifies how to obtain larger thumbnails of the content associated with the placeholder. For example, a placeholder may include an address of a service from which a larger thumbnail of a file may be requested. The service may be able to accept input that indicates the size of the thumbnail that is to be provided.

Likewise, in one implementation, a placeholder may include a lower fidelity sample (or data that identifies how to obtain such as sample) of content of a file associated with the placeholder. For example, a placeholder may include a lower fidelity sample (or link to a service) of a music, video, or other type of file.

In one implementation, a placeholder may include a data structure (e.g., a bitmap, linked list, or other data structure) that indicates which portions of the associated content are located on the local file system. This data structure may be consulted when a program seeks to access the content. If the data structure indicates that the requested content is available locally, the requested content may be obtained from local storage. If not, other actions may be taken to obtain the requested content from remote storage prior to providing the program with the content.

In one implementation, a placeholder may have a flag that indicates whether the content of the file is to be made available when offline. As indicated previously, a client may periodically lose connectivity to remote storage upon which content associated with a placeholder is found. If the flag is set, when the client is online, content for the placeholder may be downloaded to local storage and be maintained there so that the content is available even when the remote storage is unavailable.

Various embodiments may have placeholders that include any one or more of the data indicated above.

A placeholder may be used to give the illusion that a file resides on a local file system even when the content of the file resides remotely. This illusion may be maintained even when the remote file system is not reachable. This may be done by inserting the placeholder into a namespace of a local file system. The file system may be modified to recognize placeholders and to display information about a file represented by the placeholder as appropriate. For example, the file system may display the names and relevant metadata for a placeholder when a user navigates through the namespace of the local file system.

Placeholders may be used to vastly reduce the amount of storage space consumed. For example, instead of storing the content for large videos locally, placeholders may be used to indicate that the videos are available. Because the placeholders may use a much smaller amount of space than the actual content of the video, even a relatively small local storage device may include placeholders for a vast collection of files that include a significant amount of content.

Placeholders may be used when a remote storage system is unavailable. For example, when network connectivity is lost or not available, a machine may use locally stored placeholders to navigate and perform other operations on the namespace of a file system.

A placeholder is persisted even when the client machine is shutdown. Thus, the placeholder is still available when the client machine is restarted. This persistence behavior may be implemented by storing the placeholder on a local storage of the client.

Figure 2:
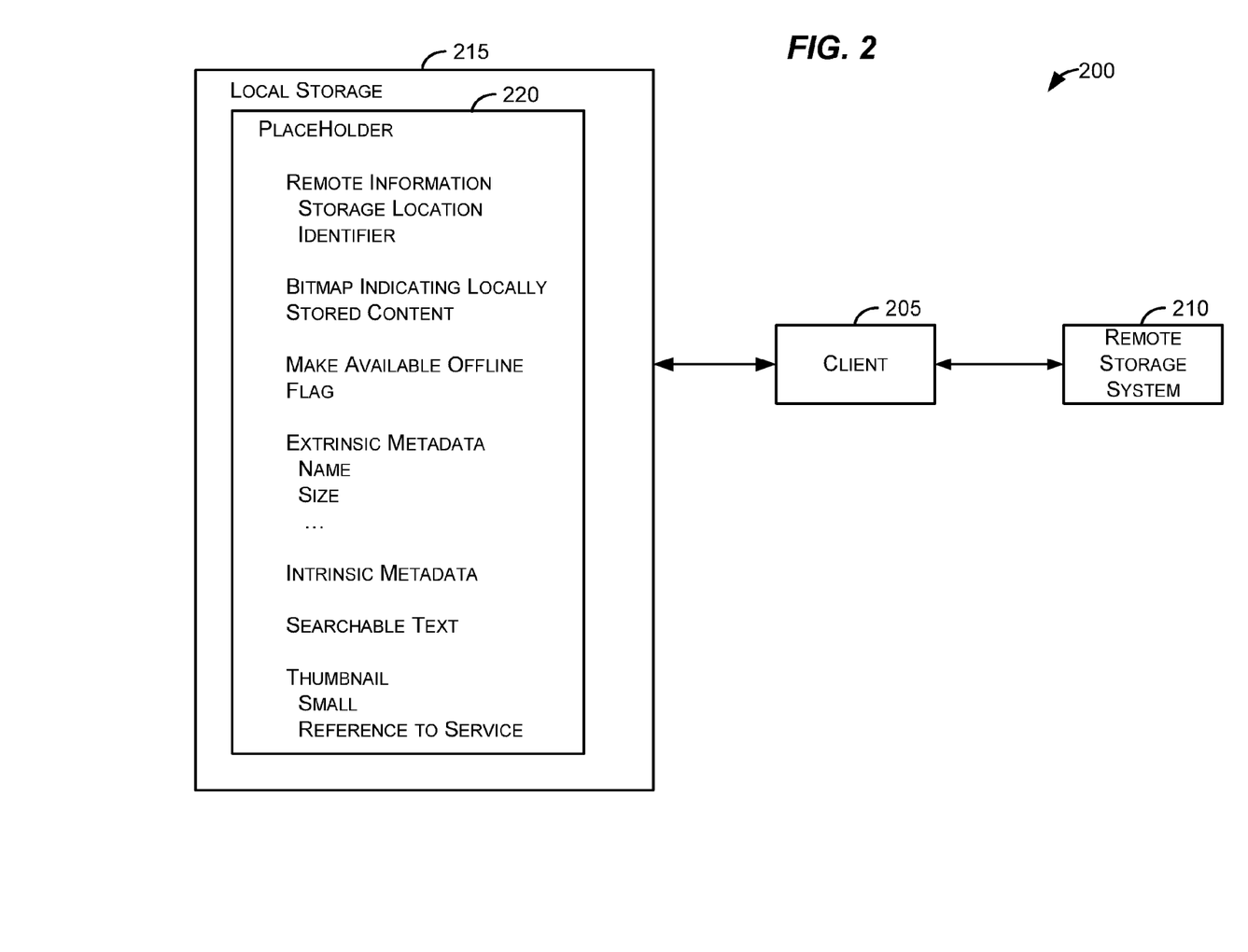
FIGS. 2-3 are block diagrams that generally represent exemplary components of systems configured to use placeholders in accordance with aspects of the subject matter described herein.
Figure 3:
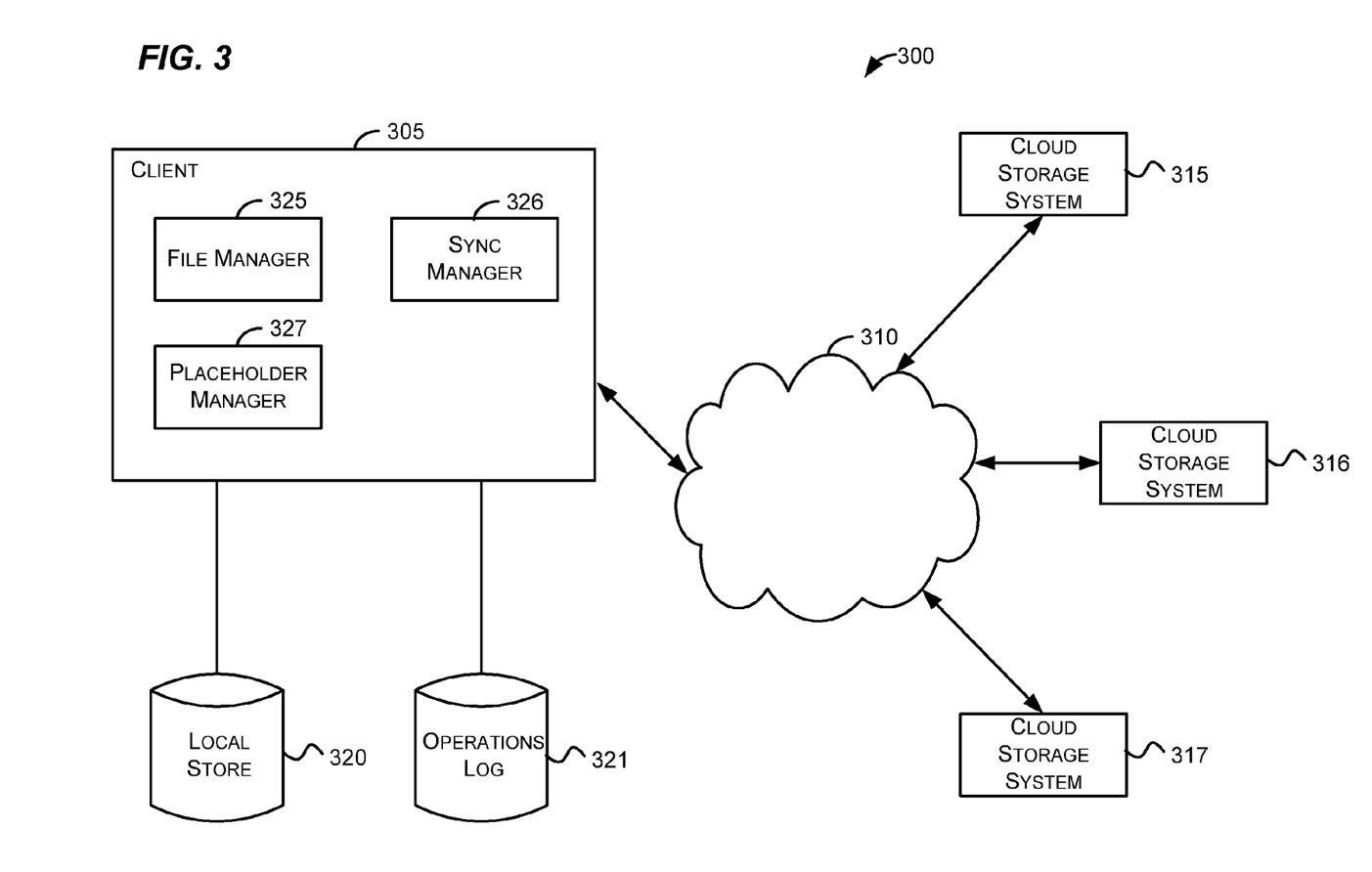

FIGS. 2-3 are block diagrams that generally represent exemplary components of systems configured to use placeholders in accordance with aspects of the subject matter described herein. The components illustrated in FIGS. 2-3 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIGS. 2-3 may be included in other components (shown or not shown) or placed in subcomponents without departing from the spirit or scope of aspects of the subject matter described herein. In some embodiments, the components and/or functions described in conjunction with FIGS. 2-3 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIGS. 2-3 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIGS. 2-3 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

Turning to FIG. 2, the system 200 may include a client 205, a remote storage system 210, local storage 215, a placeholder 220, and may include other components (not shown). The client 205 may have direct access to the local storage 215 and be connected to the remote storage system 210 through the use of a cloud network.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The local storage 215 may include any storage media capable of storing data. For example, the local storage 215 may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The local storage 215 may be external, internal, or include some components that are internal and some components that are external to the client 205. In one implementation, the local storage 215 may include any storage that is housed in a machine hosting the client 205. In another implementation, the local storage 215 may include storage that is directly connected to the machine hosting the client 205. For example, the local storage 215 may be connected to the machine via a USB link, an IEEE 1394 link, an optical link, another hard-wired link, or the like.

The remote storage system 210 may include one or more computers that are arranged to store and provide access to data. Access as used herein may include reading data, writing data, deleting data, updating data, a combination including two or more of the above, and the like. The remote storage system 210 may be connected to the client 205 via a network such as the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

In one example, the remote storage system 210 may comprise a data center where the computing devices are located in a single physical location. In another example, the remote storage system 210 may include computing devices and storage that are attached to the cloud at different locations. In one example, the remote storage system 210 may comprise a single server or other computing device that provides access to one or more storage devices. In one example, the remote storage system 210 may comprise a computing device that is not on the client 205's local area network (LAN). In another example, the remote storage system 210 may comprise any storage that is not housed in or directly connected to the client 205. In another example, the remote storage system 210 may include storage that is not available to the client 205 when the client is not connected to a network from which the storage is accessible.

Sometimes the term cloud storage system is used herein. This is not intended to be limiting with respect to remote storage systems to which the teachings herein may be applied but to provide an example of a remote storage system that may be used without departing from the spirit or scope of aspects of the subject matter described herein. Whenever the term cloud storage system is used herein, it is to be understood that in other embodiments, other types of remote storage systems may be used without departing from the spirit or scope of aspects of the subject matter described herein.

While the local storage 215 may be almost continuously available to the client 205 or may be readily made available by means available to the user (e.g., by plugging in a connector) the remote storage system 210 may, at times, become unavailable to the client 205. For example, if the client 205 is hosted on a laptop, the laptop may be moved to a location that does not have Internet access. As another example, network outages may disrupt the connectivity of the client 205 to the remote storage system 210. As another example, the remote storage system 210 may become inoperative or may be shut down or disconnected for maintenance or other purposes. Without placeholders, when connectivity with the remote storage system 210 is lost, the client 205 may not be able to navigate the namespace or perform operations on a file where the entire file content is not available on the local storage 215.

The placeholder 220 illustrates various exemplary data fields that may be stored in a placeholder stored on the local storage 215. Although only one placeholder is shown in FIG. 2, more often, there will be multiple placeholders stored on the local storage 215. For example, for a given namespace, there may be one placeholder for each remote file system object if the content of the remote file system object does not completely exist on the local storage 215. As another example, for the given namespace, there may also be placeholders for remote file system objects even when the entire content of the remote file system objects exists on the local storage 215. This second set of placeholders may also be stored on the local storage 215 for files having content with a size less than a given threshold as mentioned previously.

A namespace may include an identifier (e.g., name or other identifier) for each file of a file system together with hierarchy information regarding the file. For example, a namespace may include a namespace entry corresponding to D:\DIR1\FILE1.TXT. This namespace entry indicates the name of a file (e.g., FILE1.TXT) and indicates that the file exists in a directory (e.g., DIR1). A namespace may also include other metadata. A namespace may have a one-to-one or some other mapping with file system information and may represent virtual folder hierarchies.

Turning to FIG. 3, the system 300 may include a client 305, a cloud 310, cloud storage systems 315-317, a local store 320, an operations log 321, and other components (not shown). The client 305 may include a file manager 325, a synchronization manager 326, a placeholder manager 327, and other components (not shown).

The components of FIG. 3 may be implemented using the hardware and/or software of one or more computing devices as described previously. The storage devices that implement the local store 320 and the operations log 321 may be implemented in a similar manner as the local storage 215 of FIG. 2 and may be external, internal, or include some components that are internal and some components that are external to the client 305.

The local store 320 may have computer storage elements that maintain file system metadata for local file system objects of a local file system of the client and that maintain placeholders for remote file system objects of a cloud storage system. As mentioned previously, the placeholders may include metadata of the remote file system objects without requiring that content of the remote file system objects exist in the local store 320.

The operations log 321 may have computer storage elements that maintain data regarding changes that occur on the local file system. The data from the operations log 321 may be used to synchronize these changes with cloud storage systems. In one implementation, the operations log 321 may be omitted and changes to the local file system may be discovered by comparing a before-the-changes-state and after-the-changes-state of the local file system.

The file manager 325 may be structured to create, via the file system metadata and the placeholders, a namespace that includes the local file system objects and the remote file system objects. The file manager 325 may be further structured to provide, via an interface, metadata for the local file system objects and the remote file system objects regardless of whether connectivity exists to the cloud storage system.

In absence of connectivity to a cloud storage system, the file manager 325 may still allow operations to proceed on both files that reside locally and files represented by placeholders. For example, the file manager may update a file system data structure of the local file system to indicate an operation performed on a file system object represented by a placeholder even when the content of the file system object does not reside completely on the local store. As another example, the file manager 325 may update a namespace to reflect an operation such as a rename, move, delete, restore, create, copy operation, or the like.

The synchronization manager 326 may be structured to discover changes (e.g., content changes, metadata changes including intrinsic, extrinsic, and namespace changes, other changes and the like) that occurred to file system objects in the absence of connectivity to the cloud storage system and, when connectivity is re-established with the cloud storage system, to synchronize the changes with the cloud storage system.

In different implementations, the synchronization manager 326 may use various methods for discovering changes. For example, in one implementation, the synchronization manager 326 may discover changes by examining the operations log 321. As another example, in another implementation, the synchronization manager 326 may discover changes by comparing a state of file system and file system objects prior to the changes with a state of the file system and file system objects after the changes.

The placeholder manager 327 may be structured to create, populate, and maintain the placeholders to ensure that a placeholder exists for each remote file system object in the namespace at least if the content of the remote file system object does not completely exist on the local store 320. As mentioned previously, a placeholder may also be maintained on the local file system when the content of the remote file system object does completely exist on the local store 320.

The cloud storage systems 315-317 may include one or more storage devices together with one or more computing devices that provide access to those storage devices. In one embodiment, a cloud storage system may comprise a data center where the computing devices are located in a single physical location. In another embodiment, a cloud storage system may include computing devices and storage that are attached to the cloud at different locations. In one embodiment, a cloud storage system may comprise a single server that provides access to one or more storage devices. In one embodiment, a cloud storage system may comprise a computing device that is not on the client's local area network (LAN). In another embodiment, a cloud storage system may comprise any storage that is not housed in or directly connected to the client.

Although three cloud storage systems are shown in FIG. 2, in other implementations, there may be any number of cloud storage systems.

Figure 4:
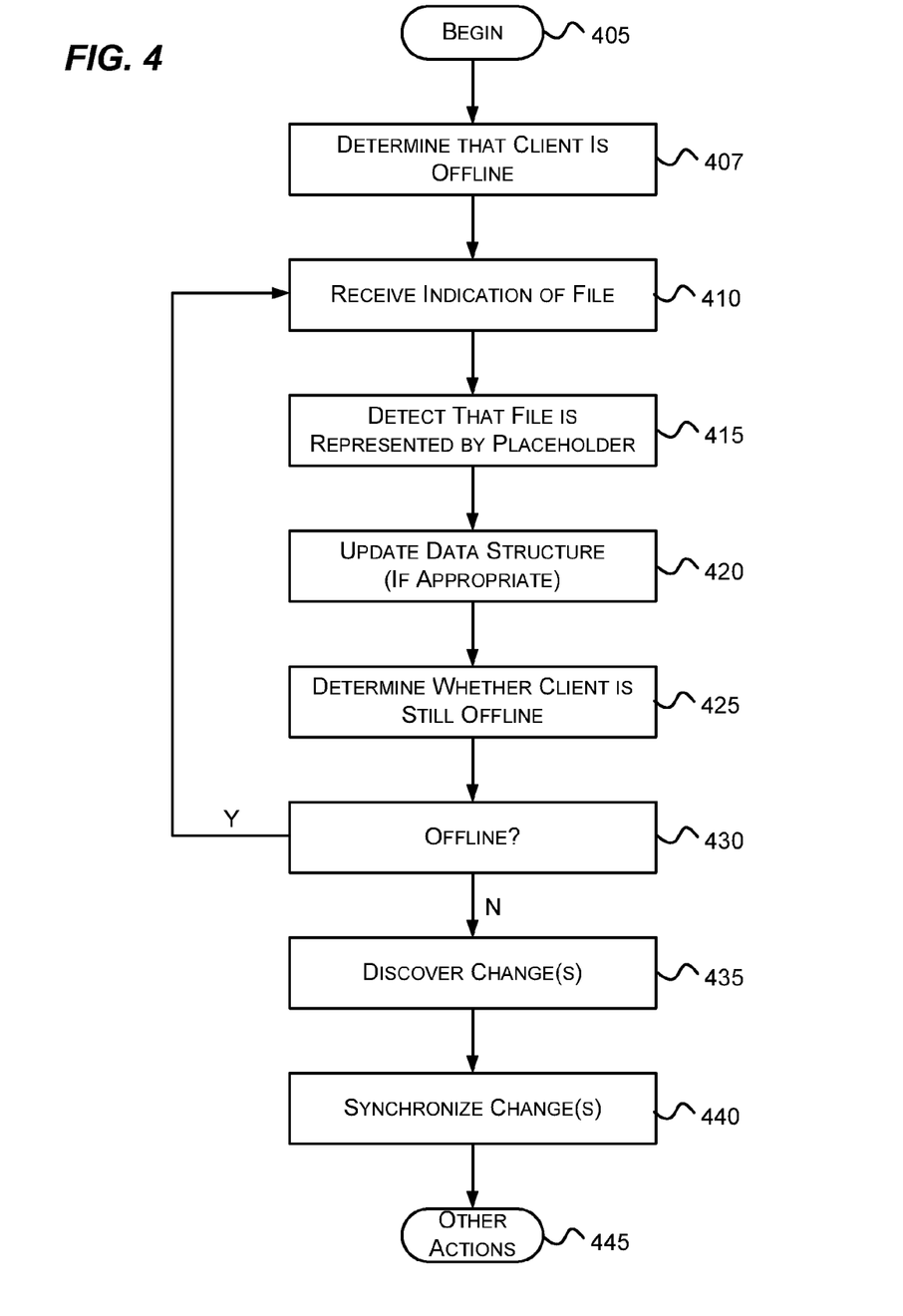
FIG. 4 is a flow diagram that generally represents exemplary actions that may occur from a client perspective in accordance with aspects of the subject matter described herein.
Figure 5:
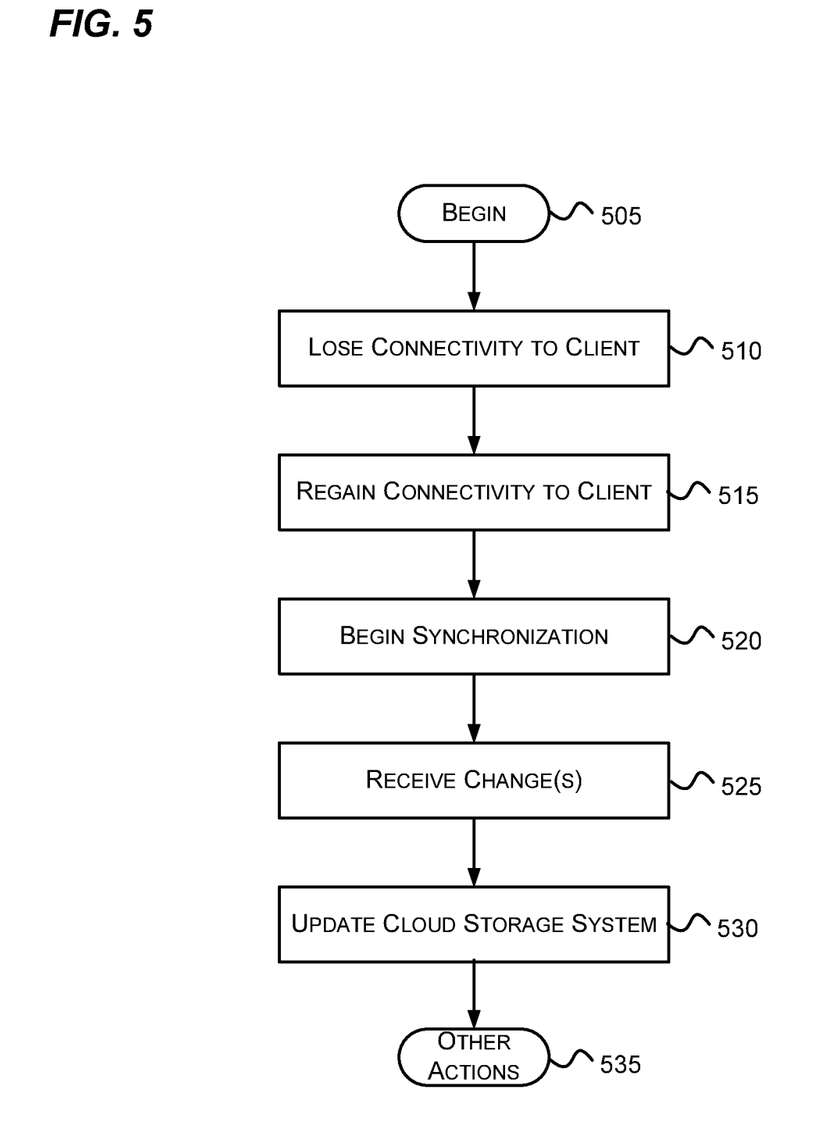
FIG. 5 is a flow diagram that generally represents exemplary actions that may occur from a cloud storage system perspective in accordance with aspects of the subject matter described herein.

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents exemplary actions that may occur from a client perspective in accordance with aspects of the subject matter described herein. At block 405, the actions begin.

At block 407, a determination is made as to whether a client is offline with respect to a cloud storage system. The client is offline with respect to a cloud storage system if the client is currently unable to communicate with the cloud storage system.

At block 410, an indication is received of a file of a local file system of a client. For example, referring to FIG. 3, the file manager 325 may receive an indication of a file from a navigation application (not shown).

At block 415, the file is detected as being represented by a placeholder. The placeholder is stored on the local file system. The placeholder indicates at least that content of the file system object exists in a cloud storage system (even if that content also exists on the local file system). For example, referring to FIG. 3, the file manager 325 detects that the file is represented by a placeholder that is stored on the local store 320.

Similarly to the metadata maintained for a file of the local file system, the placeholder may be inserted in or otherwise referenced by a namespace of the local file system. In one implementation, a namespace record that references a placeholder may be determined by a flag of the namespace record. In another implementation, a namespace record that references a placeholder may be determined by examining the metadata included in or referenced by the namespace record.

At block 420, a file system data structure may be updated depending on the operation that is requested with respect to the file. For example, if the operation is a rename, move, delete, restore, create, or copy operation, or the like, a namespace of the local file system may be updated to reflect the operation. For example, in a move operation, a namespace of the local file system may be updated to indicate that the file now resides in a new location in the namespace. As another example, in a delete operation, a namespace of the local file system may be updated to indicate that the file has been deleted with a record of the deleted file being stored in a deletion container (e.g., the file system "trash can") of the local file system. As another example, in a restore operation, a namespace of the local file system may be updated to indicate that a file has been restored from a deletion container.

In another example, the operation may be to update intrinsic or extrinsic metadata of the file. In this example, the placeholder may be updated with the changed metadata. When the intrinsic or extrinsic metadata of the file is changed, the namespace of the local file system may remain the same.

As yet another example, the operation may be to update content of the file. In this example, if the placeholder indicates that the content is available locally, the content may be updated.

In another example, there may be no need to update a file system data structure. For example, if the operation is to read a name of file, the name may be read from the placeholder and provided to the requestor of the read operation. This type of operation does not involve changing file system data structures so the actions of block 420 may be omitted in this example.

At block 425, a determination is made as to whether the client is still offline. For example, referring to FIG. 3, if the client is still unable to communicate with the cloud storage system that includes the content of a placeholder, the client may be considered offline with respect to the cloud storage system.

At block 430, if the client is still offline with respect to the cloud storage system, the actions continue at block 410 where the client may receive an indication of another file; otherwise, the actions continue at block 435.

At block 435, the changes made to the local storage system while the client was offline are discovered. As indicated previously, this discovery may take the form of reading an operations log, comparing file system state from a time previous to the changes to file system state at a time after the changes, or the like.

At block 440, changes are synchronized with the cloud storage system. For example, referring to FIG. 3, the synchronization manager 326 may synchronize changes with one or more of the cloud storage systems 315-317. For example, when an offline change involve intrinsic metadata of a file, the synchronization may include providing metadata from the placeholder to the cloud storage system for updating corresponding intrinsic metadata of the file system object that exists on the cloud storage system.

As another example, when the offline change involves restoring the file from a deletion container, the synchronization may include providing, to the cloud storage system, an identifier that identifies the file system object to the cloud storage system in conjunction with an instruction to the cloud storage system to restore the file system object from a deletion container of the cloud storage system.

At block 445, other actions, if any, may be performed. For example when the client interacts with a navigation application, the client may receive metadata requests for file system objects within a namespace of the local file system. To respond to requests that involve files that are lacking content that is available on the cloud storage system (e.g., files that are represented by placeholders) and to respond to requests that involve files that have their entire content available in the placeholder, the client may obtain metadata from the placeholders to provide to the navigation application.

As another example, periodically or at other designated times, placeholders may be created for files of a namespace of the local file system for which content is not entirely stored on the local file system. When connectivity is available, metadata and other data for the placeholders may be downloaded from the cloud storage system so that the namespace of the local file system has locally stored metadata for each file system object indicated by the namespace.

As another example, the client may detect that an operation (e.g. open, edit, or the like) is not allowed when the client is offline and may disallow the operation if the client is offline. An exception for disallowing the operation while offline may occur if the placeholder indicates that content of the file system object is stored on the local file system.

FIG. 5 is a flow diagram that generally represents exemplary actions that may occur from a cloud storage system perspective in accordance with aspects of the subject matter described herein. At block 505, the actions begin.

At block 510, connectivity is lost between a cloud storage system and a client. For example, referring to FIG. 3, the client 305 may lose connectivity to (e.g., be unable to communicate with) the cloud storage system 315. The client may have a client file system stored locally to the client (e.g., on the local store 320). The client file system may have files in which all content is located on the client file system and files in which less than all content is located on the client file system. The client has at least placeholders that represent the files in which less than all content is located on the client file system. The client may allow a first set of operations (e.g., one or more of rename, move, view, delete, restore, create, view metadata, update metadata, and the like) to proceed on the files represented by the placeholders during a period when the client is offline with respect to the cloud storage system. The client may disallow a second set of operations (e.g., one or more of rename or move across namespaces, copy, open, edit, and the like) to proceed on the files during the period when the client is offline.

At block 515, connectivity is regained between the client and the cloud storage system. For example, referring to FIG. 3, the cloud storage system 315 may regarding connectivity to (e.g., be able to communicate with) the client 305.

At block 520, synchronization may begin. For example, referring to FIG. 3, the client 305 and the cloud storage system 315 may begin synchronizing updates that occurred while the client was offline.

At block 525, a change is received that occurred to a file that is represented by a placeholder stored on a file system of a client. The change may have occurred after losing connectivity with the client and before regaining connectivity with the client. The change may be reflected on the client file system at least in part via the placeholder during a period of connectivity loss. For example, referring to FIG. 3, the cloud storage system 315 receives a change from the synchronization manager 326 of the client 305.

At block 530, the cloud storage system is updated as appropriate to reflect the change. For example, referring to FIG. 3, the cloud storage system 315 may update file system metadata and/or metadata associated with one or more files. In some cases, changes on the cloud storage system may cause that a change received from the client be discarded. For example, a file that was deleted on the client may have been also deleted on the cloud storage system during the period of no connectivity.

At block 535, other actions, if any, may be performed.

As can be seen from the foregoing detailed description, aspects have been described related to file system placeholders. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving an indication of a file system object of a local file system of a client, wherein the local file system is controlled and managed by a local file system manager on the computer, wherein the local file system comprises a local namespace controlled and managed by the local file system, wherein the local file system stores local file system objects and stores placeholders that represent respective remote file system objects, wherein the placeholders and the file system objects have respective entries in the local namespace, and wherein each placeholder contains a respective network resource location of a respective remote file system object, the remote file system object configured to bi-directionally synchronize with a respective local filesystem object represented by the respective placeholder;

based on receipt of the indication, detecting that the file system object is represented by a placeholder stored on the local file system, the placeholder indicating at least that content of the corresponding file system objects exists in a remote storage system, the placeholder containing a respective network resource location of a respective remote file system object with which the local file system object synchronizes;

determining that the client is offline with respect to the remote storage system, the client determined to be offline with respect to the remote storage system based on the client being unable to communicate with the remote storage system;

based on the determining that the client is offline, performing actions, the actions comprising:

while the client is offline, updating a file system data structure of the local file system to indicate an operation performed on the file system object via the local file system while the client is offline;

after the updating, determining that the client is no longer offline with respect to the remote storage system, and based thereon:

discovering a change that occurred to the file system object while the client was offline, the change having occurred as a result of the operation; and synchronizing the change with the remote storage system by using the network resource location in the placeholder to update the remote file system object according to the indication of the operation performed on the file system object.

2. The method of claim 1, wherein updating a file system data structure of the local file system to indicate an operation performed on the file system object comprises updating metadata stored by the placeholder, the metadata of the placeholder corresponding to intrinsic file system metadata of the file system object; and wherein synchronizing the change with the remote storage system comprises providing the file system metadata to the remote storage system for updating corresponding intrinsic file system metadata of the file system object that exists on the remote storage system.

3. The method of claim 1, wherein updating a file system data structure of the local file system to indicate an operation performed on the file system object comprises updating the file system data structure to indicate that the file system object has been restored from a deletion container; and wherein synchronizing the change with the remote storage system comprises providing, to the remote storage system, an identifier that identifies the file system object to the remote storage system in conjunction with an instruction to the remote storage system to restore the file system object from a deletion container of the remote storage system.

4. The method of claim 1, further comprising:

interacting, at the client, with a navigation application that requests metadata for file system objects within a file system namespace of the local file system; and using placeholders stored on the local file system to provide metadata for navigation requests that involve file system objects within the file system namespace that, on the local file system, are lacking content that is available on the remote storage system.

5. The method of claim 1, further comprising:

creating placeholders for file system objects of a namespace of the local file system for which content is not entirely stored on the local file system;

from the remote storage system, downloading and storing metadata for the placeholders such that the namespace of the local file system has locally stored metadata for each file system object indicated by the namespace; and from the remote storage system, obtaining thumbnail data for each of one or more of the placeholders and storing each thumbnail data in a corresponding placeholder, the thumbnail data indicating a service from which data corresponding to a thumbnail image may be obtained.

6. The method of claim 1, wherein discovering a change that occurred to the file system object while the client was offline comprises searching an operations log that stores data that indicates operations that occurred to file system objects of the local file system.

7. The method of claim 1, wherein discovering a change that occurred to the file system object while the client was offline comprises comparing a previous state of file system objects of the local file system that occurred while the client was not offline with a changed state of file system objects of the local file system that occurred after the change.

8. The method of claim 1, wherein updating a file system data structure of the local file system to indicate an operation performed on the file system object comprises updating a namespace of the local file system if the operation is a move, delete, restore, create, or copy operation; and wherein synchronizing the change with the remote storage system comprises updating the namespace of the remote storage system in accordance with the namespace as updated of the local file system.

9. The method of claim 1, further comprising detecting whether the operation is allowed if the client is offline and disallowing the operation if the operation is not allowed and the client is offline.

10. The method of claim 1, further comprising allowing the file system object to be edited while the client is offline if the placeholder indicates that content of the file system object is stored on the local file system.

11. The method of claim 1, wherein the placeholder includes a name, size, date modified, and date created of the file system object.

12. The method of claim 11, wherein the placeholder additionally includes intrinsic metadata of the file system object.

13. The method of claim 1, wherein the content on the remote storage system comprises a structured document comprised of text in a structured format, and wherein the placeholder additionally includes the text without the structured format.

14. The method of claim 1, wherein the placeholder includes a data structure that indicates portions of the content of the file system object that are stored in the local file system and indicates portions of the content of the file system object that are stored on the remote storage system but that are not stored on the local file system.

15. A computing device, comprising:
a store storing a local file system maintained and controlled on the computing device, the local file system having a corresponding local namespace, the store having computer storage elements that maintain file system metadata for local file system objects of the local file system and that maintain placeholders for remote file system objects of a remote storage system, wherein the placeholders are represented in the local namespace, the placeholders including metadata of the remote file system objects without requiring that content of the remote file system objects exist in the store, the metadata of each placeholder including a flag indicating whether the placeholder is to be made available while offline, each placeholder containing a respective network location, each network location comprising at least a respective network address and a filepath of a corresponding remote file system object;

a placeholder manager structured to create, populate, and maintain the placeholders to ensure that a placeholder exists for each remote file system object in the local namespace at least if the content of the remote file system object does not completely exist on the store; and a file system manager structured to control and manage, via the file system metadata and the placeholders, the local namespace for the local file system, wherein the local namespace includes entries for the respective local file system objects and entries for the placeholders representing the remote file system objects, the file system manager further structured to provide, via an interface, metadata for the local file system objects and the remote file system objects regardless of whether connectivity exists to the remote storage system, wherein the file system manager is further configured to determine whether to automatically populate a placeholder with file data from a corresponding remote file system object based on a value of the flag in the placeholder.

16. The computing device of claim 15, further comprising a synchronization manager structured to discover a change that occurred to the file system object in the absence of connectivity to the remote storage system and, when connectivity is re-established with the remote storage system, to synchronize the change with the remote storage system.

17. The computing device of claim 15, wherein the file manager being further structured to update the file system data structure comprises the file manager being structured to update the namespace to reflect the operation during the absence of connectivity to the remote storage system if the operation is a rename, move, delete, restore, create, or copy operation.

18. A computing device according to claim 15, wherein the placeholder manager is structured to determine to create a placeholder responsive to determining that a corresponding remote file system object is included in the namespace and does not have content stored in the store, and wherein the placeholder is created before the corresponding remote file system object has been requested on the computing device.

19. A computer storage medium having computer-executable instructions that when executed perform actions, the actions comprising:
losing connectivity with a client that has a client file system stored and maintained thereon, the client file system having file system objects in which all content is located on the client file system and having file system objects in which less than all content thereof is located on the client file system, the client having at least placeholders that represent the file system objects for which less than all content is located on the client file system, the placeholders comprising respective remote file system locations of respective remote file system objects, the placeholders included in a namespace of the client file system, at least some of the placeholders comprising content indications indicating which portions of content are not stored on the client file system, the client allowing a first set of operations to proceed on the file system objects represented by the placeholders during a period when the client is offline with respect to the remote storage system, the client disallowing a second set of operations on the file system objects during the period;

regaining connectivity with the client and during the connectivity the client allowing the second set of operations on the file system objects;

during synchronization, performing actions, comprising:

receiving a change that occurred to a file system object that is represented by a placeholder stored on the client file system, the change occurring after the losing connectivity with the client and before the regaining connectivity with the client, the change being reflected on the client file system at least in part via the placeholder during a period of connectivity loss; and based on receiving the change, using the remote file system location in the placeholder to update the remote storage system to reflect the change.

20. The computer storage medium of claim 19, wherein the change affects the namespace of the client file system, the change being reflected on the client file system via the placeholder during the period of connectivity loss.

* * * * *